United States Patent
Du et al.

(10) Patent No.: US 11,303,208 B2
(45) Date of Patent: Apr. 12, 2022

(54) CYCLE TRANSITIONS FOR BUCK CONVERTER CIRCUITS

(71) Applicant: Apple Inc., Cupertino, CA (US)

(72) Inventors: Dingkun Du, Santa Clara, CA (US); Michael B. Nussbaum, Santa Cruz, CA (US); Jitendra K. Agrawal, Fremont, CA (US); Floyd L. Dankert, Austin, TX (US); Jay B. Fletcher, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 16/290,769

(22) Filed: Mar. 1, 2019

(65) Prior Publication Data

US 2020/0280256 A1  Sep. 3, 2020

(51) Int. Cl.
 *G06F 1/28* (2006.01)
 *H02M 3/158* (2006.01)
 *G06F 1/3296* (2019.01)

(52) U.S. Cl.
 CPC .............. *H02M 3/158* (2013.01); *G06F 1/28* (2013.01); *G06F 1/3296* (2013.01)

(58) Field of Classification Search
 None
 See application file for complete search history.

(56) References Cited

U.S. PATENT DOCUMENTS

| | | | |
|---|---|---|---|
| 9,882,480 B2 | 1/2018 | Lee et al. | |
| 2016/0190921 A1 | 6/2016 | Kumar et al. | |
| 2016/0241146 A1* | 8/2016 | Oliaei | H02M 3/158 |
| 2016/0352219 A1* | 12/2016 | Amgad Abdulslam | H02M 3/07 |
| 2017/0055322 A1* | 2/2017 | Jiang | H02M 3/07 |
| 2017/0163157 A1* | 6/2017 | Petersen | H02M 1/14 |
| 2018/0205307 A1 | 7/2018 | Vukadinovic et al. | |
| 2018/0358896 A1* | 12/2018 | Puggelli | H02M 3/158 |

* cited by examiner

*Primary Examiner* — Fahmida Rahman
(74) *Attorney, Agent, or Firm* — Kowert, Hood, Munyon, Rankin & Goetzel, P.C.

(57) ABSTRACT

A voltage regulator circuit included in a computer system may include multiple devices and a switch node coupled to a regulated power supply node via an inductor. The voltage regulator circuit may charge a capacitor using an input power supply signal, and couple the capacitor to the switch node using respective subsets of the multiple devices, which are selected based on one or more control signals. A control circuit may generate the one or more control signals based on a particular switching sequence, which is selected based on a ratio of a voltage level of the regulated power supply node and a voltage level input power supply signal.

16 Claims, 9 Drawing Sheets

Table 401
Vout/Vin < 1$^{st}$ threshold
(Low Conversion Ratio)

|  | Cycle 1 | Cycle 2 | Cycle 3 | Cycle 4 | Cycle 5 | Cycle 6 |
|---|---|---|---|---|---|---|
| Active Devices | 201, 203 | 203, 204 | 204 | 202, 204 | 203, 204 | 203 |

Table 402
Vout/Vin > 2$^{nd}$ threshold
(High Conversion Ratio)

|  | Cycle 1 | Cycle 2 | Cycle 3 | Cycle 4 | Cycle 5 | Cycle 6 |
|---|---|---|---|---|---|---|
| Active Devices | 201, 202 | 201, 203 | 201 | 201, 202 | 202, 204 | 202 |

Table 403
1$^{st}$ threshold < Vout/Vin < 2$^{nd}$ threshold
(Medium Conversion Ratio)

|  | Cycle 1 | Cycle 2 | Cycle 3 | Cycle 4 |
|---|---|---|---|---|
| Active Devices | 201, 202 | 201, 203 | 203, 204 | All Devices Off |

|  | Cycle 5 | Cycle 6 | Cycle 7 | Cycle 6 |
|---|---|---|---|---|
| Active Devices | 201, 202 | 202, 204 | 203, 204 | All Devices Off |

CYCLE TRANSITIONS FOR BUCK CONVERTER CIRCUITS

BACKGROUND

Technical Field

This disclosure relates to power management in computer systems and more particularly to voltage regulator circuit operation.

Description of the Related Art

Modern computer systems may include multiple circuits blocks designed to perform various functions. For example, such circuit blocks may include processors, processor cores configured to executed execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments for generating a regulator power supply voltage level are disclosed. Broadly speaking, a voltage regulator circuit including a capacitor, a plurality of devices, and a switch node coupled to a regulated power supply node via an inductor/The voltage regulator circuit may be configured to couple the switch node to the capacitor using a first set of the plurality of devices that are selected based on one or more control signals and charge the capacitor by coupling the capacitor to an input power supply signal using a second set of the plurality of devices that are selected based on the one or more control signals. A control circuit may be configured to select a particular one of a plurality of switching sequences based on a ratio of a voltage level of the regulated power supply node and a voltage level of the input power supply signal, and generate the one or more control signals based on the particular one of a plurality of switching sequences.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. The phrase "based on" is thus synonymous with the phrase "based at least in part on."

DETAILED DESCRIPTION OF EMBODIMENTS

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a three-level buck converter circuit. Such converter circuits include multiple devices and a switch node that is coupled to a regulated power supply node via an inductor. For a given switching sequence, the switch node is coupled to a fly capacitor using different sets of the multiple devices included in the converter circuit during different cycles of operation of the voltage regulator circuit. As used and described herein, a switching sequence specifies one or more devices of a voltage regulator circuit are activated during each cycle of a plurality of cycles used during the operation of a voltage regulator circuit.

Three-level buck converters can be operated in different operation modes. In one mode, current flows through the inductor in each cycle of the multiple switching cycles included in a given switching sequence. Such modes are referred to as continuous conduction modes (CCM). Alternatively, in another mode, no current may flow in the inductor in one or more of the cycles. This type of mode is referred to as discontinuous conduction mode (DCM).

Different switching sequences may be used during the different operation modes of a voltage regulator circuit. A selection of switching sequences may be based on whether the voltage regulator circuit is operating in CCM or DCM mode, as well as a value for a conversion ratio for the voltage regulator circuit in order to maintain efficient operation of the voltage regulator circuit. As used and described herein, a conversion ratio is a ratio of a voltage level of an output regulated power supply node generated by the voltage regulator circuit to a voltage level of an input power supply node for the regulator circuit. It is noted that, in some embodiments, the ratio of the voltage level of the input power supply node to the voltage level of the output regulated power supply node may also be used.

In some cases, a value of the conversion ratio may be used to determine operation mode of the voltage regulator circuit. Such operation modes may activate devices within the regulator circuit according to different sequences in order to source energy to a load circuit(s) coupled to the output of the regulator circuit. In some embodiments, the value of the conversion ratio may be compared to a threshold value and different operation modes selected based on result of the comparison. For example, the conversion ratio may be compared to a threshold value of fifty percent. When the conversion ratio is less than fifty percent a low conversion ratio operation mode is selected and when the value of the conversation ratio is greater than fifty percent, a high conversion ratio operation mode is selected.

Abrupt changes from the low conversion ratio operation mode to the high conversion ratio operation mode, or vice versa, can result in undesired voltage excursions, or ripple, of the regulated supply node, which can affect load circuit performance. The embodiments illustrated in the drawings and described below may provide techniques for using a hybrid operation mode, which includes cycles similar to both the low and high conversion operation modes, when the conversion ratio is near a threshold value that triggers a switch from low conversion operation mode to high conversion operation mode, thereby providing a smooth transition between the operation modes.

Figure 1:
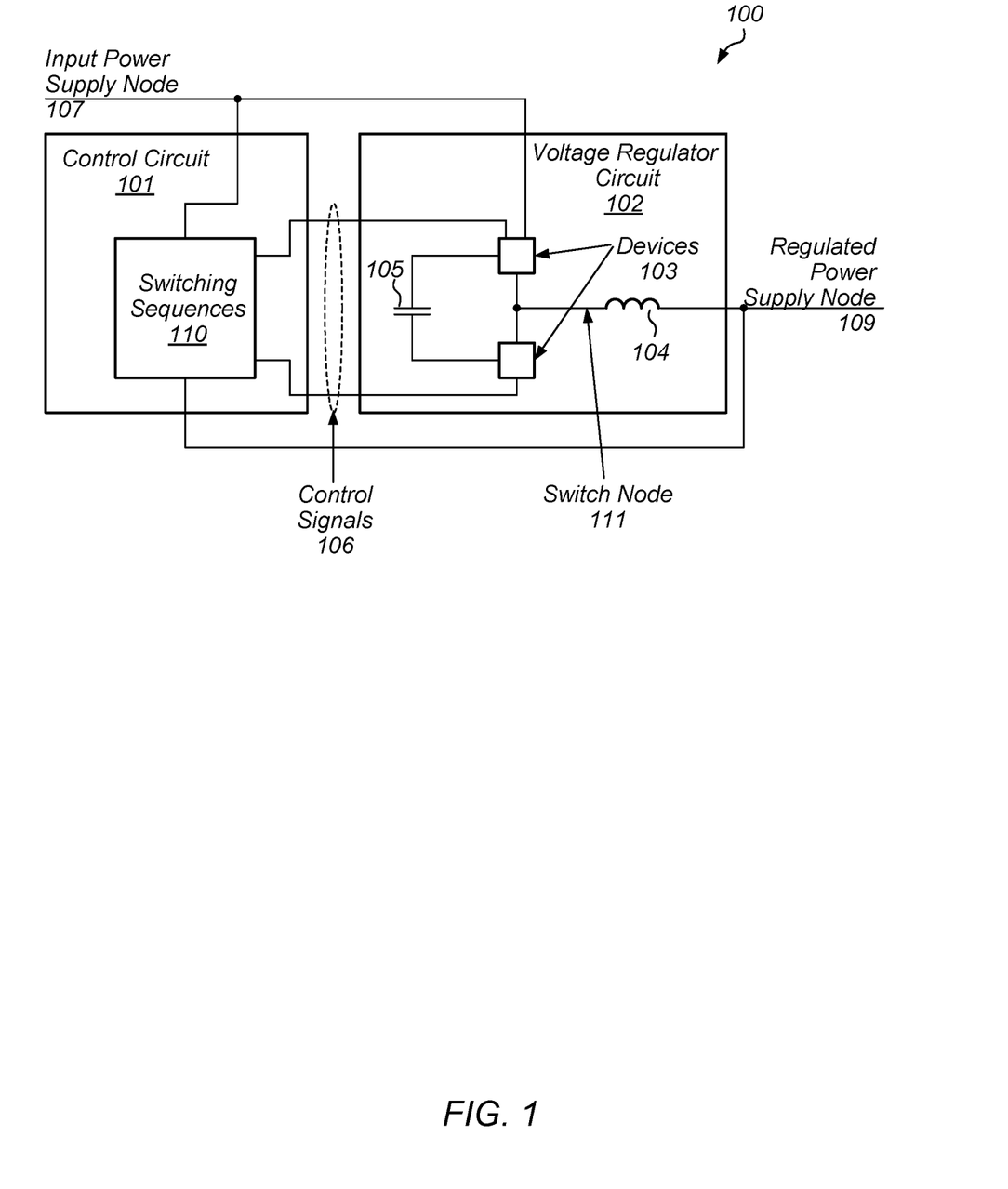
FIG. 1 is a block diagram of an embodiment of a power converter circuit for a computer system.

A block diagram depicting an embodiment of a power converter circuit is illustrated in FIG. 1. As illustrated, power converter circuit 100 includes control circuit 101 and voltage regulator circuit 102, which includes devices 103, fly capacitor 105, and inductor 104. Devices 103 are coupled to fly capacitor 105 and switch node 111, and are controlled by control signals 106. Inductor 104 is coupled to switch node 111 and regulated power supply node 108.

Voltage regulator circuit 102 is configured to couple switch node 111 to fly capacitor 105 using a first set of devices 103 based on control signals 106, and charge fly capacitor 105 by coupling fly capacitor 105 to input power supply node 107 using a second set of devices 103 that are selected based on control signals 106.

In order to maintain efficiency of voltage regulator circuit 102, control circuit 101 may use the conversion ratio to select a particular switching sequence for activating devices 103. In various embodiments, control circuit 101 is configured to select a particular one of switching sequences 110 based on a ratio of a voltage level of regulated power supply node 108 to a voltage level of input power supply node 107, and generate control signals 106 based on the particular one of switching sequences 110. By comparing the voltage levels of regulated power supply node 108 and input power supply node 107, control circuit 101 can identify the particular conversion ratio regime in which voltage regulator circuit 102 is operating, and select an appropriate switching sequence for the identified conversion ratio regime, thereby improving efficiency and operation of voltage regulator circuit 102.

When the conversion ratio is close to fifty percent, control circuit 101 may select a different switching sequence in order maintain efficiency and low ripple of voltage regulator circuit 102 during the transition between low and high conversion ratio regimes. To identify the switch over from low to high conversion ratio operation (or vice versa), control circuit 101 may employ multiple threshold values. For example, in some cases, control circuit 101 may use a first threshold value of forty percent and a second threshold value of sixty percent to identify the switch from low to high (or high to low) conversion ratios.

To make use of the multiple threshold values, control circuit 101 may be further configured to select a first switching sequence of the plurality of switching sequences in response to a determination that a ratio of a voltage level of the regulated power supply node 108 to a voltage level of input power supply node 107 is less than the first threshold value. In some embodiments, control circuit 101 may be configured to select a second switching sequence of switching sequences 110, in response to a determination that the ratio of the voltage level of the regulator power supply node 108 and the voltage level of the input power supply node 107 is greater than the second threshold value, which is greater than the first threshold value.

When the conversion ratio is between the first and second threshold values, the control circuit may be further configured to select a third switching sequence of the plurality of switching sequences in response to a determination that the ratio of the voltage level of regulated power supply node 108 to the voltage level of input power supply node 107 is greater than the first threshold value and less than the second threshold value. In various embodiments, the third switching sequence may specify multiple active times for respective devices within a particular cycle. As described below in more detail, during the third switching sequence, the control circuit may be further configured to control a target value for an initial current flowing through inductor 104.

Figure 2:
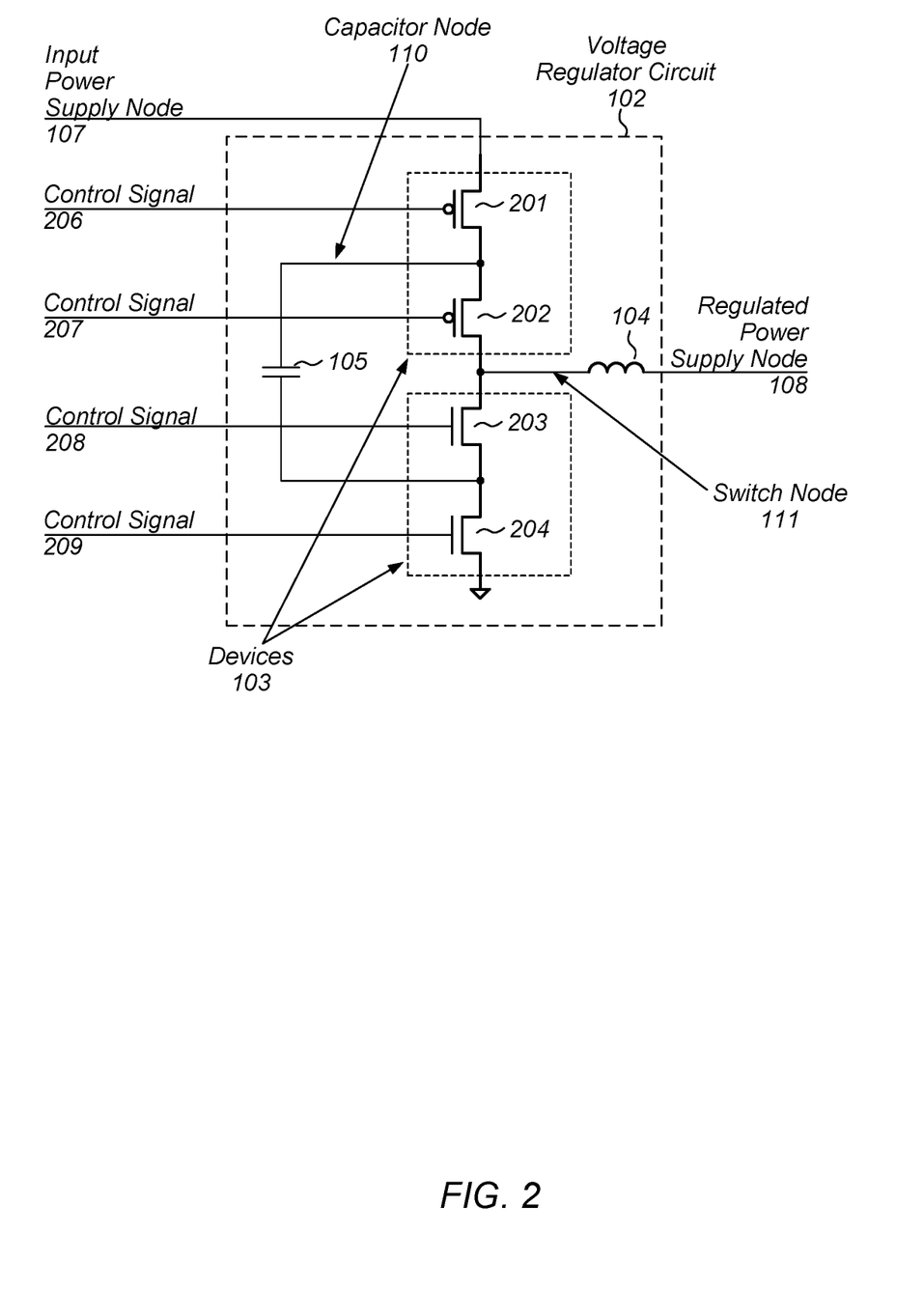
FIG. 2 illustrates a schematic diagram of an embodiment of a voltage regulator circuit.

Voltage regulator circuit, such as voltage regulator circuit 102, may be designed according to one of various design styles. An example of a particular implementation of voltage regulator circuit 102 is depicted in FIG. 2. As illustrated, voltage regulator circuit 102 includes devices 103, inductor 104, and fly capacitor 105.

One terminal of fly capacitor 105 is coupled between devices 201 and 202, and the other terminal of fly capacitor 105 is coupled between devices 203 and 204. In various embodiments, fly capacitor 105 may be located on a same integrated circuit as voltage regulator circuit 102, and may be particular embodiment of a metal-oxide-metal (MOM) capacitor or any other suitable capacitor structure capable of being manufactured on an integrated circuit as part of a semiconductor manufacturing process. In other cases, fly capacitor 105 may be located on a different integrated circuit, or be a discrete component mounted on a board or other substrate to which an integrated circuit included voltage regulator circuit 102 is also mounted.

In a similar fashion to fly capacitor 105, inductor 104, which is coupled between switch node 111 and regulated power supply node 108, may be fabricated on the same integrated circuit as voltage regulator circuit 102. In other embodiments, inductor 104 may be a discrete component that is co-located on a circuit board or other substrate to which voltage regulator circuit 102 is also mounted.

Devices 103 include devices 201 through 204. As illustrated, device 201 is coupled to input power supply node 107 and device 202, and is controlled by control signal 206. Device 202 is coupled to device 201 and switch node 111, and is controlled by control signal 207. In a similar fashion, device 203 is coupled between switch node 111 and device 204, while device 204 is coupled between a ground circuit node and device 203. Device 203 is controlled by control signal 208, and device 204 is controlled by control signal 209. In various embodiments, control signals 206-209 are included in control signals 106 as depicted in FIG. 1.

In various embodiments, each of devices 201 through 204 may be particular embodiments of metal-oxide semiconductor field-effect transistors (MOSFETs). For example, devices 201 and 202 may be p-channel MOSFETs, which are activated by low logic levels on control signals 206 and 207, respectively. Devices 203 and 204 may be n-channel MOSFETs, which are activate by high logic levels on control signals 208 and 209, respectively.

As shown in more detail in FIG. 4 below, different devices may be activated during different cycles based upon a particular switching sequence that is selected based on the conversion ratio. Table 1, for example, illustrates a switching sequence for a low conversion case. During the cycle 1 of the switching sequence, devices 201 and 203 are active, devices 201 and 203 are active, allowing fly capacitor 105 to be charged using input power supply node 109. In cycle 2, device 201 is deactivate and device 204 is activated.

In cycle 3, device 204 is left active. Since only device 204 is active, the current through inductor 104 is unchanged, as there is no conduction path since only one device is active. By leaving device 204 active, there is no need to activate the device as cycle 4 begins, thereby reducing power dissipation associated with switching the gate load of device 204 and its associated wiring.

As cycle 4 beings, device 202 is activated, while device 204 remains active. The new arrangement of active devices couples fly capacitor 105 to switch node 111. Upon completion of cycle 4, cycle 5 begins by deactivating device 202 and activating device 203, providing a conduction path from switch node 111 to ground.

In a similar fashion to device 204 in cycle 3, device 203 is left active during cycle 6 since device 203 will be used in cycle 1 as the switching cycle repeats after cycle 6 is completed. As described above, by leaving device 203 active during cycle 6, power dissipated with the switching the gate load of device 203 is reduced.

The active devices for each cycle of a switching sequence for a high conversion ratio is illustrated in table 402. In cycle 1, devices 201 and 202 are active, and devices 203 and 204 are inactive. This arrangement of devices coupled both switch node 111 and one terminal of fly capacitor 105 to input power supply node 109. As cycle 2 begins, device 202 is deactivate and device 203 is activated, allowing fly capacitor 105 to be charged using input power supply node 109.

Like the low conversion ratio case, cycle 3 keeps a single device, in this case device 201 active since it will be active in cycle 4. As described above, power dissipation associated with switching the gate load of device 201 may be reduced by keeping device 201 active during cycle 3.

Cycle 4 is similar to cycle 1 with devices 201 and 202 active. As cycle 5 begins, device 201 is deactivated and device 204 is activated, coupling capacitor 105 to switch node 111. At the conclusion of cycle 5, device 204 is deactivated and device 202 is left active during cycle 6 since device 202 will be active in cycle 1, which will start as the switching sequence repeats upon the conclusion of cycle 6.

In table 403, a medium conversion case, i.e., the conversion ratio is between two threshold values, eight cycles may be employed. During cycle 1, devices 201 and 202 may be activated, coupling both switch node 111 and one terminal of fly capacitor 105 to input power supply node 109. After a particular time period, which may be adjusted to control an initial current through inductor 104, cycle 2 begins with device 201 remaining active, while device 202 is deactivated and device 203 is activated. This new arrangement of active devices allows for fly capacitor 105 to be charged using input power supply node 109.

During cycle 3, devices 203 and 204 are activated, while the other devices are inactive, providing a conduction path from switch node 111 to ground. During cycle 4, all of devices 201-204 are inactive, providing a high impedance to switch node 111.

Once cycle 4 has ended, devices 201 and 202 are re-activated for cycle 5, again coupling switch node 111 to input power supply node 109. During cycle 6, devices 201 is deactivated and device 204 is activated. This new arrangement of active devices couples fly capacitor 105 to switch node 111.

Upon the completion of cycle 6, devices 203 and 204 are activated for cycle 7. The activation of devices 203 and 204, as with cycle 3, provides a conduction path from switch node 111 to ground. To complete the switching sequence, cycle 8, like the cycle 4, deactivates all of the devices.

The cycles described above may be repeated as long as the conversion ratio remains between the two threshold values. Once the conversion ratio changes such that it is less than the first threshold value or greater than the second threshold value, control circuit 101 will select a different switching sequence.

Figure 3:
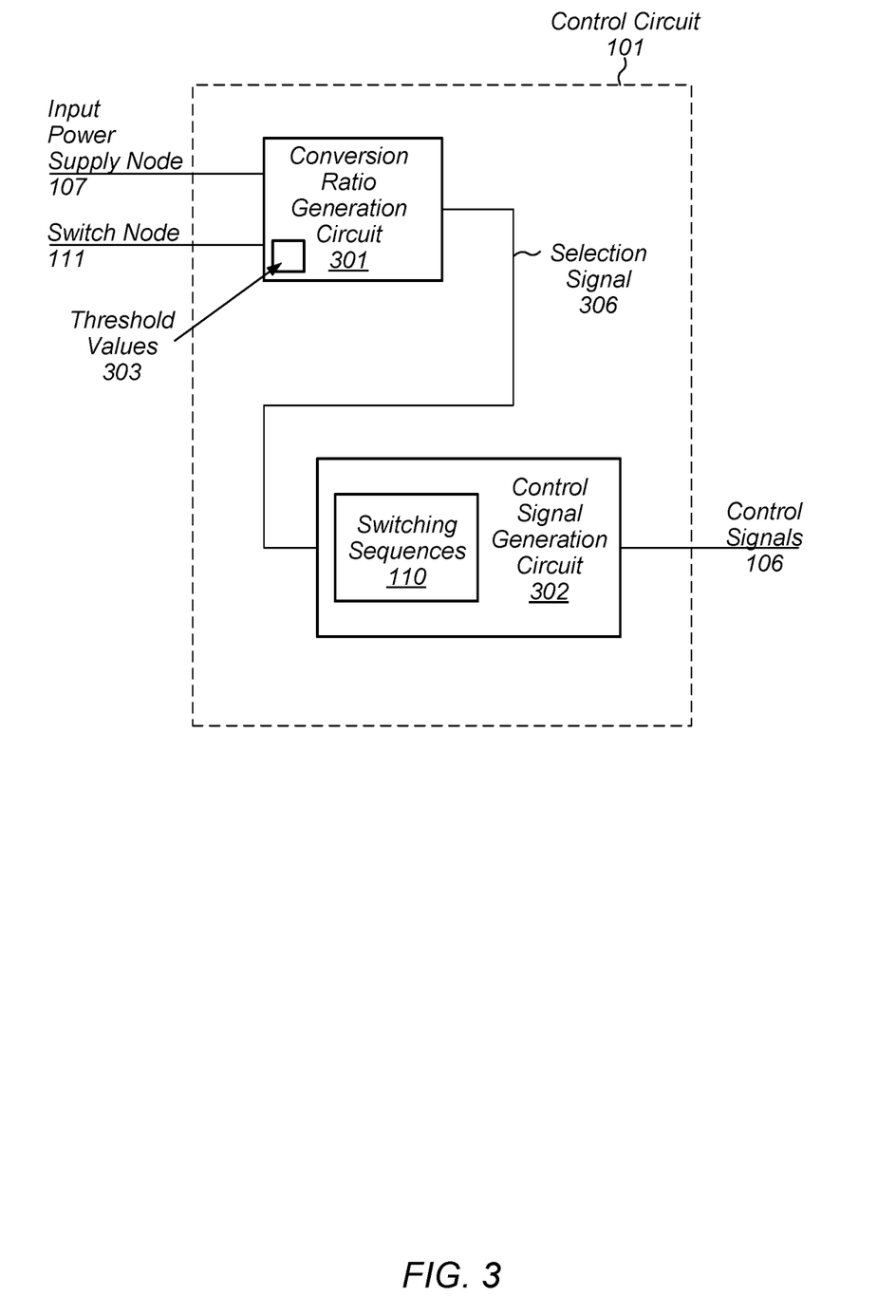
FIG. 3 illustrates a schematic diagram of an embodiment of a control circuit included in a power converter circuit.

Turning to FIG. 3, an embodiment of control circuit 101 is depicted. As illustrated, control circuit 101 includes conversion ratio generation circuit 301 and control signal generation circuit 302.

Conversion ratio generation circuit 301 is configured to generate a conversion ratio using respective voltage levels of input power supply node 109 and switch node 111, and then compare the generated conversion ratio to one of threshold values 303 in order to generate selection signal 306. It is noted that in various embodiments, instead of the voltage level switch node 111, conversion ratio generation circuit 301 may use the voltage level of regulated power supply node 108. Conversion ratio generation circuit 301 may, in some embodiments, include voltage reference circuits, differential amplifiers, analog-to-digital converter circuits, or any other suitable circuit that may be employed to generate the conversion ratio and compare it to the threshold values.

Threshold values 303 may be generated by one or more voltage reference circuits or may be stored as multiple data bits in register circuits. In some cases, the values of the individual threshold values may be programmable during operation, or may be set after manufacture during testing.

Control signal generation circuit 302 is configured to generate control signals 106 based on a current cycle as defined by a selected one of switching sequences 110. To generate control signals 106, control signal generation circuit 302 may determine an active time for signals used to activate particular devices within a given cycle of a selected switching sequence. Control signal generation circuit 302 may include one or more state machines or sequential logic circuits configured to transition through respective sets of states corresponding to particular ones of switching sequences 110. In various embodiments, control signal generation circuit 302 may include one or more timer or other suitable circuits that may be employed to track active times of individual ones of control signals 106.

As described below in more detail, while voltage regulator circuit 102 is operating in a medium conversion ratio regime, control signal generation circuit 302 may adjust the active time of control signals used in particular cycles of the medium conversion ratio switching sequence based on a control law or function. To use the control law or function, limit values may be selected that, when used in conjunction with the control law or function, generates a control value based on the voltage level of input power supply node 107. The control value may be used to scale a target value for the current during a portion of one or more cycles of the switching sequence.

Control signal generation circuit 302 may be designed using one of various design methodologies. For example, in various embodiments, switching sequences 110 and control signal generation circuit 302 may be described using a register-transfer level (RTL) description, e.g., Verilog, of the operation of the aforementioned circuits. The RTL description of the circuit may be translated into a collection of logic gates using logic synthesis software that selects logic gates from a library of available logic gates on a given semiconductor manufacturing process allowing for different logic gate implementations based on timing constraints, available logic gates in the library, and the like.

Figure 4:
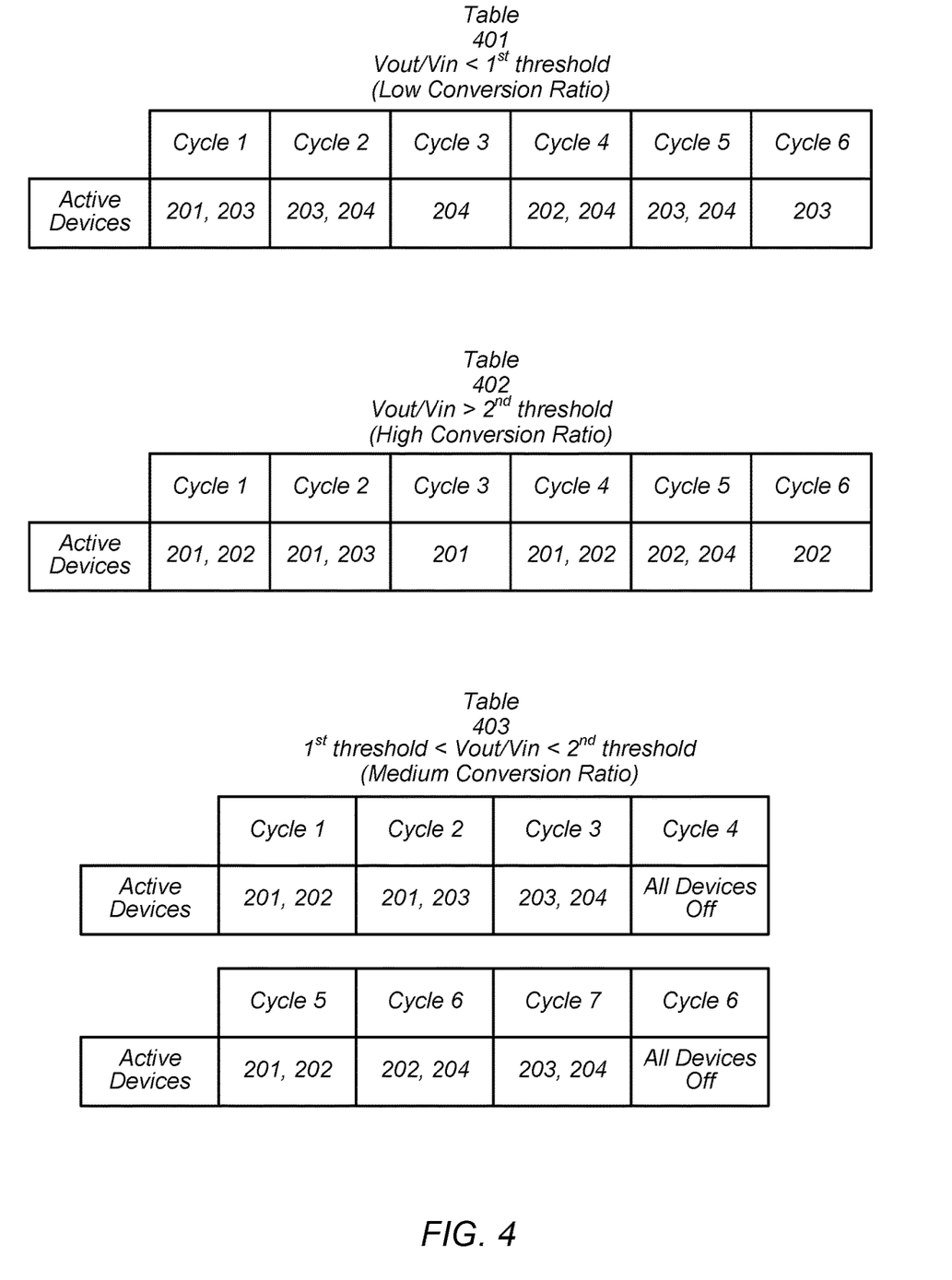
FIG. 4 is a series of tables depicting active devices during each cycle of different switching sequences.

Turning to FIG. 4, three tables are illustrated which depict an example of devices active during different cycles for various operating regimes of voltage regulator circuit 102. Each operating regime is identified by the ratio of the voltage level of regulated power supply node 109 (identified as "Vout") to the voltage level of input power supply node 107 (identified as "Vin"). In a low conversion ratio regime, the ratio of Vout/Vin is less than a first threshold, while in a high conversion ratio regime, the ratio of Vout/Vin is greater than a second threshold value. When the ratio of Vout/Vin is between the first and second thresholds, voltage regulator circuit 102 is operating in a medium conversion ratio regime. As described above, in some embodiments, the first and second thresholds made be centered around 50%. For example, the first threshold may be 40% and the second threshold may be 60%.

Table 401 depicts which devices are active during which cycle while voltage regulator circuit 102 is operating in low conversion ratio regime. During cycle 1, devices 201 and 203 are active, while the remaining devices included in devices 103 are inactive, thereby coupling fly capacitor 105 between input power supply node 107 and switch node 111.

At the conclusion of cycle 1, device 201 is de-activated and device 204 is activated during cycle 2. With this arrangement of active devices, a conduction path from switch node 111 to ground is provided, allowing current to flow back from inductor 104 to ground. With the conclusion of cycle 2, device 203 is de-activated and device 202 activated in cycle 3. The arrangement of active devices in cycle 3, couples fly capacitor 105 to switch node 111, allowing current to flow from fly capacitor 105 to inductor 104.

When cycle 3 concludes, cycle 4 is initiated by de-activating device 202 and re-activating device 203. In a similar fashion to cycle 2, cycle 4 provides a conduction path between switch node 111 and ground. It is noted that the duration of each cycle is determined by control circuit 101, may be adjusted based on operating conditions, in response to user input, or any other suitable mechanism. Although only four cycles were depicted in Table 1, in other embodiments, additional cycles, e.g., a tri-state cycle where all devices are inactive, may be employed.

Table 402 depicts which devices are active in the cycles when voltage regulator circuit 102 is operating in a high conversion ratio regime. In the case of high conversion ratio operation, devices 201 and 202 are active during cycle, coupling one terminal of fly capacitor 105 to input power supply node 107. At the conclusion of cycle 1, device 202 is de-activated and device 203 is activated during cycle 2. With the arrangement of active devices in cycle 2, allows for fly capacitor 105 to be charged using input power supply node 107.

Upon the conclusion of cycle 2, cycle 3 returns to the same configuration of active devices as cycle 1. When cycle 3 ends, device 201 is de-activated and device 204 is activated in cycle 4. The arrangement of active devices in cycle 4, couples fly capacitor 105 to switch node 111, allowing current to flow from fly capacitor 105 to inductor 104. At the conclusion of cycle 4, operation may resume with cycle 1 until a change in the conversion ratio is detected. As with the operation described in regard to Table 401, additional cycles may be employed during high conversion ratio operation as well.

As described above, in a transition from low conversion ratio operation to high conversion ratio operation (or vice-versa), a medium conversion ratio set of cycles may be employed. The cycles depicted in Table 403 are referred to as a "hybrid mode" as the active devices are a mixture of both the high conversion ratio cycles and the low conversion ratio cycles.

During cycle 1, devices 201 and 202 may be activated, coupling both switch node 111 and one terminal of fly capacitor 105 to input power supply node 107. Upon the conclusion of cycle 1, cycle 2 begins with device 201 remaining active, while device 202 is deactivated and device 203 is activated. The arrangement of active devices in cycle 2 allows for fly capacitor 105 to be charged using input power supply node 107.

During cycle 3, devices 203 and 204 are activated, while the other devices are inactive, providing a conduction path from switch node 111 to ground. cycle 3, all of devices 201-204 are inactive, providing a high impedance to switch node 111.

Once cycle 4 has ended, devices 201 and 202 are re-activated as cycle 5 starts, again coupling switch node 111 to input power supply node 109. During cycle 6, devices 201 is deactivated and device 204 is activated. This arrangement of active devices in cycle 6 couples fly capacitor 105 to switch node 111.

Upon the completion of cycle 6, devices 203 and 204 are activated for cycle 7. The activation of devices 203 and 204, as with cycle 3, provides a conduction path from switch node 111 to ground. To complete the sequence of cycles, cycle 8, like cycle 4, deactivates all of the devices.

Figure 5:
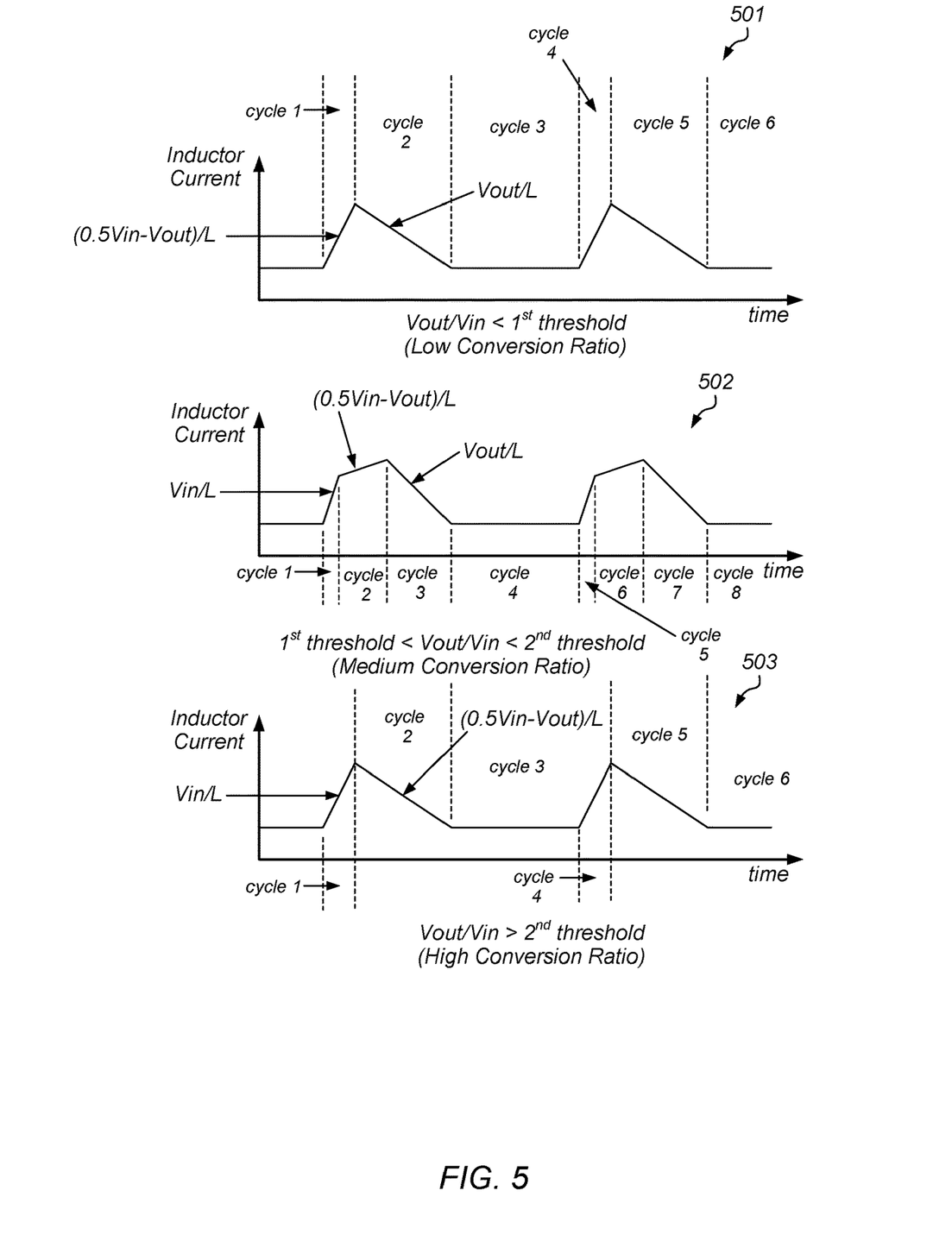
FIG. 5 illustrates example waveforms associated with the operation of a power converter circuit.

To illustrate the effect of the various arrangement of active devices have on the current in inductor 104, example waveforms for each of the conversion ratio regimes are depicted in FIG. 5.

Graph 501 depicts the inductor current in voltage regulator circuit 102 operating in a low conversion ratio regime. In this case, during cycle 1, the rate of change of the current through inductor 104 is (0.5Vin−Vout)/L, where Vin is the voltage level of input power supply node 107, Vout is the voltage level of regulated power supply node 108, and L is the value of inductor 104. With this voltage across the inductor 104, inductor current continues to increase, until the end of cycle 1.

During cycle 2, the rate of change of the current sunk from inductor 104 is Vout/L. In this case, the value of inductor current decreases, until the end of cycle 2. As described above in regard to FIG. 4, a single device is active, limiting any changes in the inductor current. The single device may be left active, in various embodiments, to reduce power dissipation associated with switching a load associated with the device. In some embodiments, cycle 3 may correspond to the non-conduction portion of DCM operation. In cycles 4 and 5, the slope of the inductor current is defined in a similar fashion to cycles 1 and 2, respectively. Like cycle 3, cycle 6 may also have a single active device as described in FIG. 4.

Turning to Graph 502, inductor current during medium conversion ratio operation is illustrated. During cycle 1, the rate of change of the current sourced to inductor 104 is given by Vin/L, causing inductor current to increase. As cycle 1 ends, cycle 2 begins and the arrangement of active devices in cycle 2 changes the rate of change of the current sourced to inductor 104 to (0.5Vin−Vout)/L, causing inductor current to continue to increase, but with a smaller slope. Upon completion of cycle 2, the active devices are switched again for cycle 3, resulting in a rate of change of the current of Vout/L being sunk from inductor 104, thereby causing Vout to decrease.

As described above, during cycle 4 all of the devices are off in voltage regulator circuit 102. Since all of the devices are de-activated, the is no conduction path through the devices, resulting in no inductor current. With no inductor current Vout slowly decays depending on the current drawn by the load and output capacitance according to $$I_{load} = C\frac{dv}{dt}.$$

During cycles 5, 6, 7, and 8, the inductor current is the same as described above for cycles 1, 2, 3, and 4, respectively, which results in similar values of Vout. By using active device arrangements similar to those used in both low and high conversion ratio operation, the transition between low and high conversion ratio operation is improved, providing less excursions in the voltage level of regulated power supply node 109 as the transition is made.

Turning to Graph 503, the inductor current for high conversion ratio operation is illustrated. During cycle 1, the rate of change of the current sourced to inductor 104 is defined by Vin/L, resulting in an increase in inductor current. Upon the conclusion of cycle 1, a rate of change of current of (0.5Vin−Vout)/L is sunk from inductor 104 during cycle 2, resulting in a decrease in Vout. As described above, only a single device is active during cycle 3, which prevents further changes to the inductor current. In some embodiments, cycle 3 may correspond to the non-conduction portion of DCM operation. During cycles 4 and 5, the inductor current is defined in a similar fashion to cycles 1 and 3, respectively. Like cycle 3, cycle 6 also only has a single active device, preventing further changes in the inductor current.

In some cases, it is desirable to have power converter circuit 100 to have a switching frequency and a ripple in the voltage level of regulated power supply node 109 that is constant with respect to the conversion ratio.

During DCM operation, each cycle delivers a quantum of energy to the output. The quantum of energy corresponds to the area under the curve of the inductor current waveform. By employing a control law on the inductor current, the amount of energy delivered to the load can be made relatively constant per cycle. In some embodiments, the control of the current may be accomplished by controlling the current target during cycles 1 and 5 of the medium conversion ratio cycles. To control the current target, the duration of particular ones of control signals 106 may be adjusted.

By adjusting the current target, a higher initial current target is used for the low conversion ratio end of the cycles and a lower initial current target is used for the high conversion ratio end of the cycles. With different current targets, ripple on the voltage level on regulated power supply node 109 may be relatively constant. Additionally, the switching frequency of voltage regulator circuit 102 may also be relatively constant. As used herein, the term "relatively constant" refers to a condition in which a particular value, e.g., the voltage level of regulated power supply node, varies within a range of values around a desired value during operation of a circuit.

Figure 6:
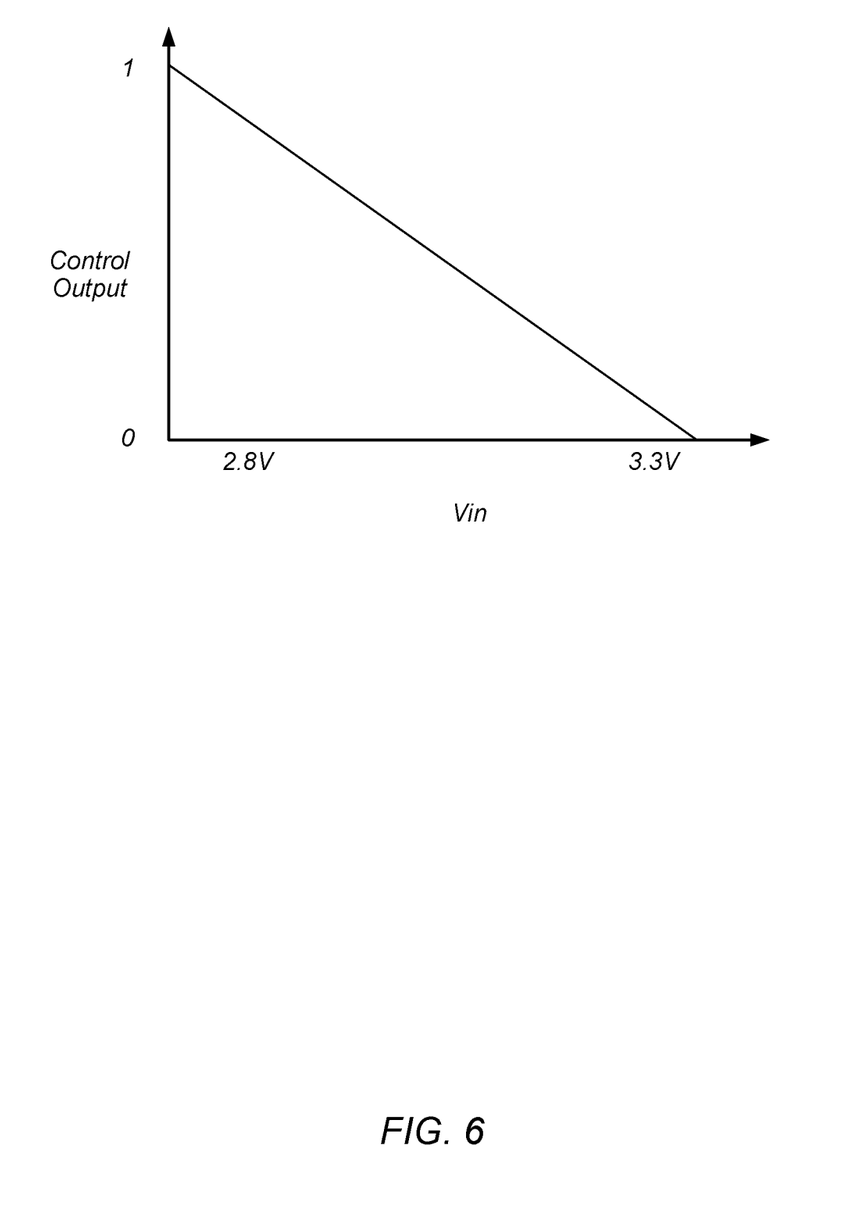
FIG. 6 illustrates example control law for an initial current flowing through the inductor for a power converter circuit operating under medium conversion ratio conditions.

An example of a control law that provides the relatively constant ripple and switching frequency is illustrated in FIG. 6. The control law is given in Equation 1, where $V_{in}$ is the voltage level of input power supply node 107, $V_{set1}$ is a desired voltage level of regulated power supply node 109, histart is a voltage level specifying the beginning of the high conversion end of the medium conversion ratio regime, and medstart is a voltage level specifying the low conversion end of the medium conversion ratio regime. For example, in some cases, medstart may be 0.45V, histart, may be 0.55, and $V_{set1}$ may be 1.5V.

$$\text{Control} = 1 - \left( \frac{V_{in} - \dfrac{V_{set1}}{histart}}{\dfrac{V_{set1}}{medstart} - \dfrac{V_{set1}}{histart}} \right) \quad (1)$$

As illustrated, the control law described by Equation 1 generates an output that is linearly decreasing from 1 to 0 as Vin increase from the lower end to the upper end of the medium conversion ratio region. In various embodiments, the value generated by Equation 1 is used to multiple a set point for the current through the inductor. The set point results in a current, or alternatively a time, associated with the first switching time of cycles 1 and 5 of the medium conversion ratio cycles.

Figure 7:
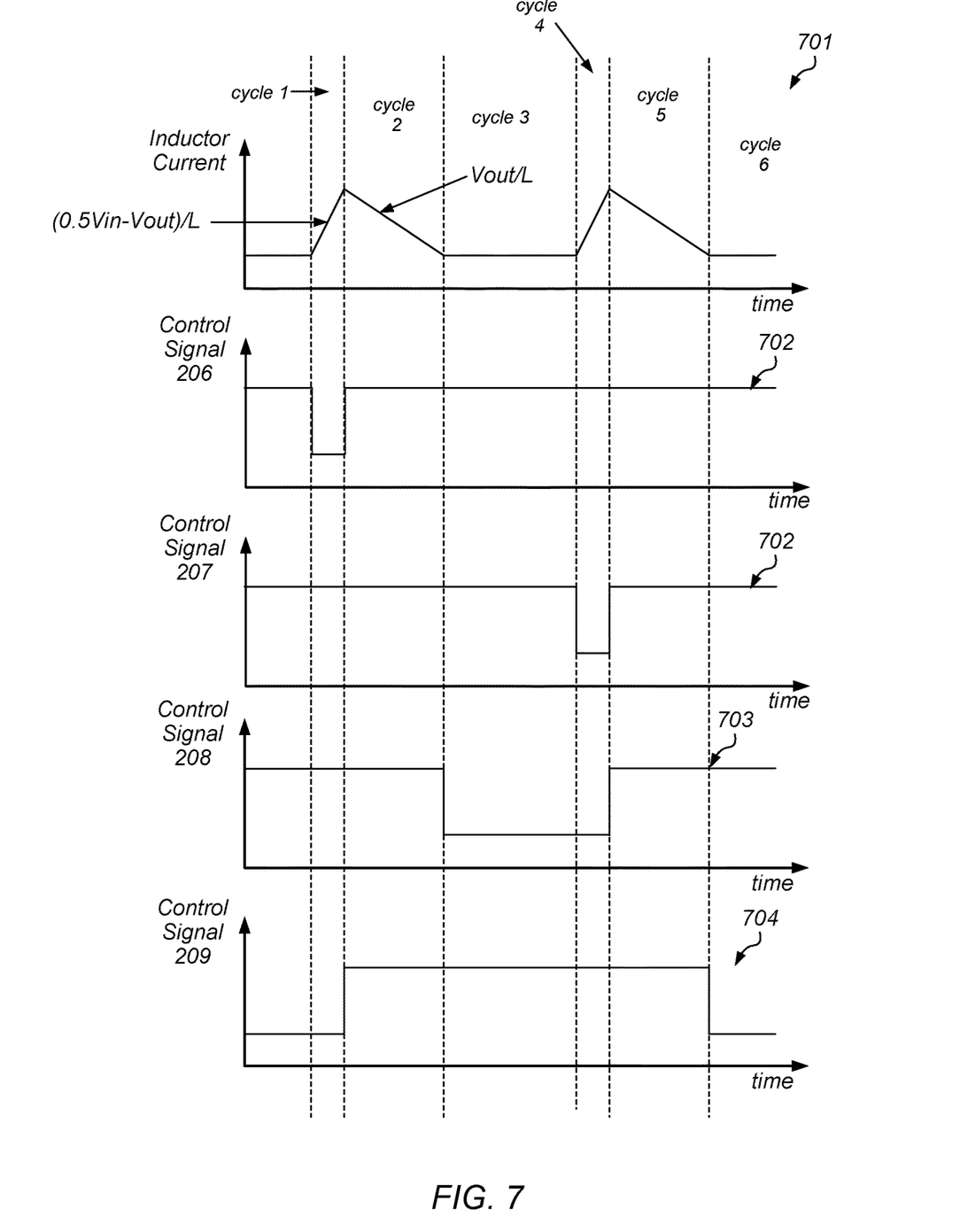
FIG. 7 illustrates example waveforms associated with the activation of devices in a voltage regulator circuit.

Turning to FIG. 7, four sets of example waveforms are depicted to further illustrated how control signals 206-208 are used to activate devices during the various cycles of a switching sequence. Graph 701 depicts current through inductor 104 while voltage regulator circuit 102 is operating in a low conversion ratio regime. Cycles 1-6 may, in various embodiments, correspond to cycles 1-6 as depicted in table 401 of FIG. 4. Graph 702 depicts control signal 206, and graph 702 depicts control signal 207. Graph 703 depicts control signal 208 and graph 704 depicts control signal 208.

During cycle 1, control signal 206 is at low logic level activating device 201, and control signal 208 is at a high logic level activating device 203. Once cycle 1 completes, cycle 2 starts and control signal is set to a high logic level deactivating device 201, and control signal 209 is set to a high logic level activating device 204.

As described above in regard to FIG. 4, during cycle 3 only device 204 is active. To accomplish this, control signal 209 is left at a high logic level, while control signal 208 is set to a low logic level deactivating device 203. Since control signal 209 does not transition, power dissipated from switching the state of control signal 209 is reduced or eliminated.

As cycle 3 ends and cycle 4 starts, control signal 207 is set to a low logic level, activating device 202. Control signal 209 is left at a high logic level keeping device 204 active. In cycle 5, control signal 207 is set to a high logic level deactivating device 202, and control signal 208 is set to a high logic level, activating device 203.

In a similar fashion to cycle 3, cycle 6 keeps device 203 active as it will be used again in cycle 1 as the switching sequence repeats. Device 203 is kept active by control signal 208 remaining at a high logic level. Control signal 209 is set to a low logic level deactivating device 204.

It is noted that while the example waveforms depicted in FIG. 7 represent low conversion ratio operation of regulator circuit 102, high conversion ratio operation of regulator circuit 102 may result in similar waveforms.

Figure 8:
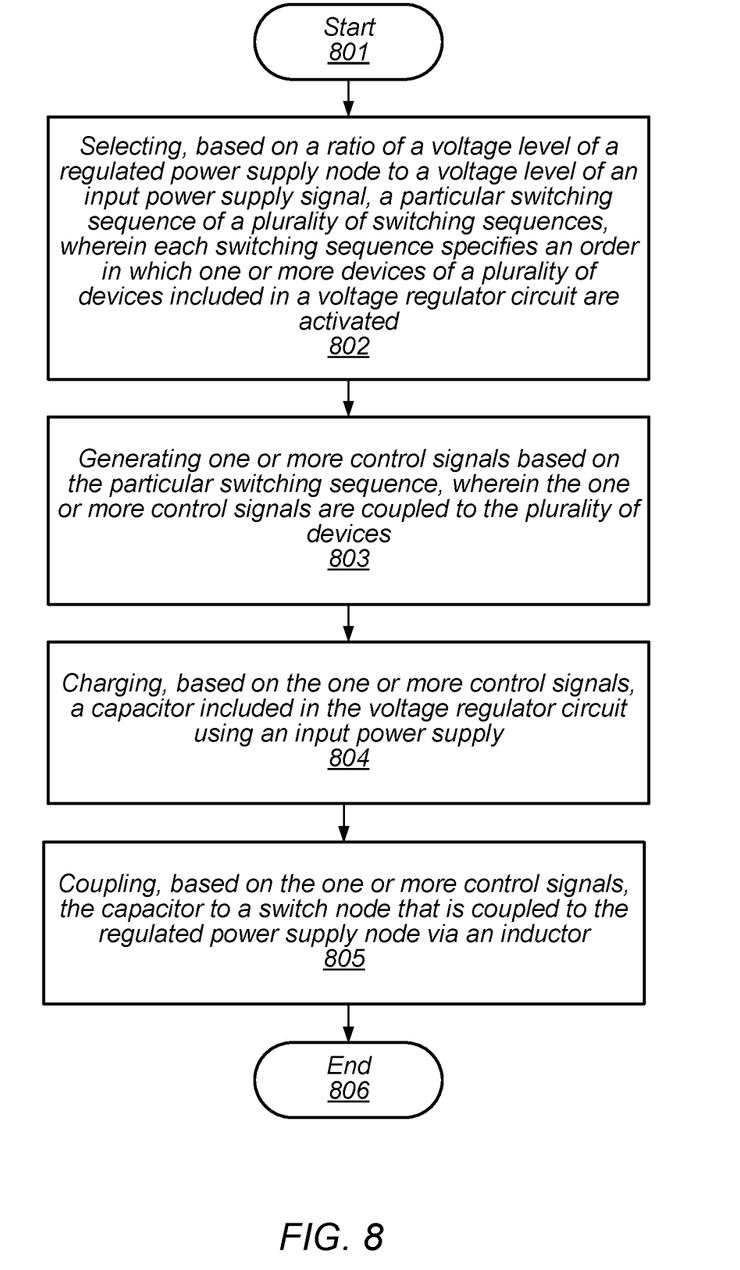
FIG. 8 illustrates a flow diagram depicting an embodiment of a method for operating a three-level buck converter.

Turning to FIG. 8, a flow diagram depicting an embodiment of a method for operating a three-level buck converter is illustrated. The method, which may be applied to various three-level buck converter circuits, e.g., voltage regulator circuit 102, begins in block 801.

The method includes selecting, based on a ratio of a voltage level of a regulated power supply node to a voltage level of an input power supply signal, a particular switching sequence of a plurality of switching sequences, wherein each switching sequence specifies an order in which one or more devices of a plurality of devices included in a voltage regulator circuit are activated (block 802). As noted above, in some embodiments, the ratio of the voltage level to the input power supply signal to the voltage level of the regulated power supply node may be used. In such cases, different values for the threshold values may be employed.

The method further includes generating one or more control signals based on the particular switching sequence, wherein the one or more control signals are coupled to the plurality of devices (block 803). Additionally, the method includes charging, based on the one or more control signals, a capacitor included in the voltage regulator circuit using an input power supply (block 804) and coupling, based on the one or more control signals, the capacitor to a switch node that is coupled to the regulated power supply node via an inductor (block 805).

In some cases, selecting the particular switching sequence of the plurality of switching sequences includes selecting a first switching sequence of the plurality of switching sequences in response to determining that a ratio of the voltage level of the regulated power supply node to the voltage level of an input power supply node is less than a first threshold value. The method may, in some embodiments, include selecting a second switching sequence of the plurality of switching sequences, in response to determining that the ratio of the voltage level of the regulated power supply node to the voltage level of the input power supply node is greater than a second threshold value greater than the first threshold value.

In various embodiments, the method may include selecting a third switching sequence of the plurality of switching sequences in response to determining that the ratio of the voltage level of the regulated power supply node to the voltage level of the input power supply node is greater than the first threshold value and less than the second threshold value. The third switching sequence may, in various embodiments, be a hybrid switching sequence that includes cycles in common with the first and second switching sequences. For example, the third switching sequence may include at least one cycle in common with the first switching sequence and another cycle in common with the second switching sequence. In some cases, the third switching sequence of the plurality of switching sequences includes a plurality of cycles including a cycle where no devices of the plurality of devices are activated.

In some cases, the method may include, while using the third switching sequence, controlling a target value for an initial current flowing through the inductor during an initial cycle included in the third switching sequence. As part of controlling the target value for the initial current flowing through the inductor, the method may, in some embodiments, include adjusting an active time of at least one of the plurality of control signals. The method concludes in block 806.

Figure 9:
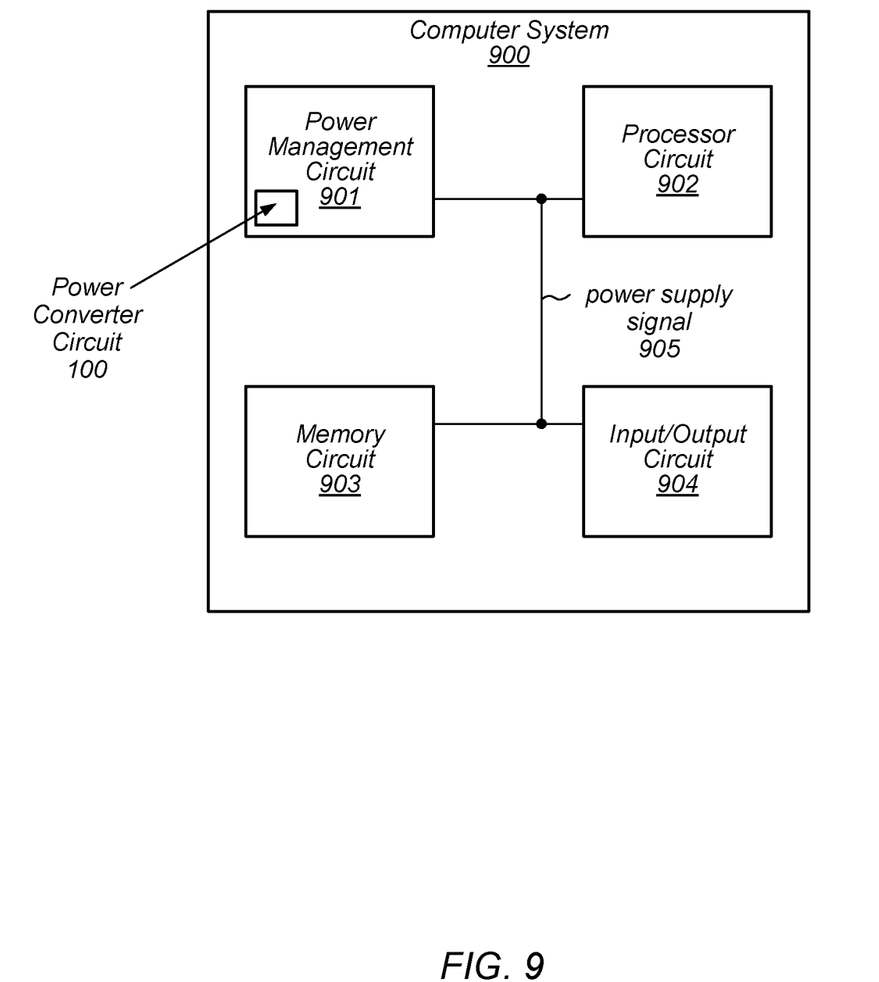
FIG. 9 is a block diagram of one embodiment of a system-on-a-chip that includes a power management circuit.

A block diagram of computer system is illustrated in FIG. 9. In the illustrated embodiment, the computer system 900 includes power management unit 901, processor circuit 902, input/output circuits 904, and memory circuit 903, each of which is coupled to power supply signal 905. In various embodiments, computer system 900 may be a system-on-a-chip (SoC) and/or be configured for use in a desktop computer, server, or in a mobile computing application such as, e.g., a tablet, laptop computer, or wearable computing device.

Power management unit 901 includes power converter circuit 100 which is e configured to generate a regulated voltage level on power supply signal 905 in order to provide power to processor circuit 902, input/output circuits 904, and memory circuit 903. Although power management unit 901 is depicted as including a single power converter circuit, in other embodiments, any suitable number of power converter circuits may be included in power management unit 901, each configured to generate a regulated voltage level on a respective one of multiple internal power supply signals included in computer system 900.

Processor circuit 902 may, in various embodiments, be representative of a general-purpose processor that performs computational operations. For example, processor circuit 902 may be a central processing unit (CPU) such as a microprocessor, a microcontroller, an application-specific integrated circuit (ASIC), or a field-programmable gate array (FPGA).

Memory circuit 903 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 9, in other embodiments, any suitable number of memory circuits may be employed.

Input/output circuits 904 may be configured to coordinate data transfer between computer system 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol.

Input/output circuits 904 may also be configured to coordinate data transfer between computer system 900 and one or more devices (e.g., other computing systems or integrated circuits) coupled to computer system 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a voltage regulator circuit including a capacitor, a plurality of devices, and a switch node coupled to a regulated power supply node via an inductor, wherein the voltage regulator circuit is configured to:
      couple the switch node to the capacitor using a first set of the plurality of devices that are selected based on one or more control signals; and
      charge the capacitor by coupling the capacitor to an input power supply signal using a second set of the plurality of devices that are selected based on the one or more control signals; and
   a control circuit configured to:
      compare a voltage level of the switch node to a voltage level of the input power supply signal to generate a conversion ratio;
      compare the conversion ratio to a plurality of threshold values to generate a selection signal;
      select, using the selection signal, a particular one of a plurality of switching sequences that includes an ordered set of cycles;
      determine a control value for a current flowing through the inductor during an initial cycle of the ordered set of cycles using the voltage level of the input power supply signal, a desired voltage for the regulated power supply node, and the plurality of threshold values; and
      generate the one or more control signals based on the particular one of the plurality of switching sequences and using the control value.

2. The apparatus of claim 1, wherein the control circuit is further configured to select a first switching sequence of the plurality of switching sequences in response to a determination that the conversion ratio is less than a first threshold value of the plurality of threshold values.

3. The apparatus of claim 2, wherein the control circuit is further configured to select a second switching sequence of the plurality of switching sequences in response to a determination that the conversion ratio is greater than a second threshold value of the plurality of threshold values, wherein the second threshold value is greater than the first threshold value.

4. The apparatus of claim 3, wherein the control circuit is further configured to select a third switching sequence of the plurality of switching sequences in response to a determination that the conversion ratio is greater than the first threshold value and less than the second threshold value.

5. The apparatus of claim 4, wherein the control circuit is further configured to, during the third switching sequence, control a target value for an initial current flowing through the inductor using the control value.

6. The apparatus of claim 5, wherein to control the target value for the initial current flowing through the inductor, the control circuit is further configured to adjust an active time of at least one of the one or more control signals.

7. A method, comprising:
   comparing, by a control circuit for a voltage regulator circuit, a voltage level of an input power supply signal to a voltage level of a switch node coupled to a regulated power supply node via an inductor to generate a conversion ratio;
   comparing, by the control circuit, the conversion ratio to a plurality of threshold values to generate a selection signal;
   selecting, by the control circuit using the selection signal, a particular switching sequence of a plurality of switching sequences that specifies a respective order in which one or more devices of a plurality of devices included in the voltage regulator circuit are activated, wherein a first switching sequence of the plurality of switching sequences corresponds to a first range of conversion ratio values that are less than a first threshold value of the plurality of threshold values, wherein a second switching sequence of the plurality of switching sequences corresponds to a second range of conversion ratio values that are greater than a second threshold value of the plurality of threshold values that is greater than the first threshold value, and wherein a third switching sequence of the plurality of switching sequences corresponds to a third range of conversion ratio values that are greater than the first threshold value and less than the second threshold value;

generating, by the control circuit, one or more control signals based on the particular switching sequence, wherein the one or more control signals are coupled to the plurality of devices;

charging, by the voltage regulator circuit and based on the one or more control signals, a capacitor included in the voltage regulator circuit using an input power supply;

coupling, by the voltage regulator circuit and based on the one or more control signals, the capacitor to the switch node;

and after changes that result in a new conversion ratio that is within the third range:

selecting, by the control circuit, the third switching sequence, wherein the third switching sequence includes at least a first cycle in common with the first switching sequence and a second cycle in common with the second switching sequence.

8. The method of claim 7, further comprising, determining a control value for a current flowing through the inductor during an initial cycle of a set of ordered cycles included in the third switching sequence using the voltage level of the input power supply signal, a desired voltage for the regulated power supply node, and the plurality of threshold values.

9. The method of claim 8, wherein the third switching sequence of the plurality of switching sequences includes a plurality of cycles including at least one cycle in which no devices of the plurality of devices are activated.

10. The method of claim 9, further comprising, while using the third switching sequence, controlling a target value for a current flowing through the inductor during the initial cycle included in the third switching sequence using the control value.

11. The method of claim 10, wherein controlling the target value for the current flowing through the inductor during the initial cycle, includes adjusting an active time of at least one of the one or more control signals.

12. An apparatus, comprising:
a processor circuit coupled to a regulated power supply node; and
a power converter circuit coupled to an input power supply signal, wherein the power converter circuit includes a plurality of devices, and a switch node coupled to the regulated power supply node via an inductor, and wherein the power converter circuit is configured to:

compare a voltage level of the input power supply signal to a voltage level of the switch node to generate a conversion ratio;

compare the conversion ratio to a plurality of threshold values;

select a first switching sequence of three switching sequences in response to a determination that the conversion ratio is greater than a first threshold value of the plurality of threshold values and less than a second threshold value of the plurality of threshold values;

select a second switching sequence of the three switching sequences in response to a determination that the conversion ratio is less than the first threshold value;

select a third switching sequence of the three switching sequences in response to a determination that the conversion ratio is greater than the second threshold value, wherein the second threshold value is greater than the first threshold value, wherein the first switching sequence includes at least a first cycle in common with the second switching sequence and a second cycle in common with the third switching sequence;

generate one or more control signals based on the selected switching sequence;

couple the switch node to a capacitor using a first set of the plurality of devices that are selected based on the one or more control signals; and charge the capacitor by coupling the capacitor to the input power supply signal using a second set of the plurality of devices that are selected based on the one or more control signals.

13. The apparatus of claim 12, wherein the power converter circuit is further configured to determine a control value for a current flowing through the inductor during an initial cycle of a set of ordered cycles included in a given one of the three switching sequences using the voltage level of the input power supply signal, a desired voltage for the regulated power supply node, and the plurality of threshold values.

14. The apparatus of claim 13, wherein the first switching sequence includes a plurality of cycles including at least one cycle where no devices of the plurality of devices are activated.

15. The apparatus of claim 13, wherein the power converter circuit is further configured to, during the first switching sequence, control a target value for a current flowing through the inductor during an initial cycle included in the first switching sequence using the control value.

16. The apparatus of claim 15, wherein to control the target value, the power converter circuit is further configured to adjust an active time of at least one of the one or more control signals.

* * * * *